United States Patent [19]

Dablain

[11] Patent Number: 4,982,382
[45] Date of Patent: Jan. 1, 1991

[54] METHOD OF MODELING SUBSURFACE FORMATIONS

[75] Inventor: Mark A. Dablain, Plano Collin County, Tex.

[73] Assignee: Mobil Oil Corporation, Fairfax, Va.

[21] Appl. No.: 366,043

[22] Filed: Jun. 14, 1989

[51] Int. Cl.$^5$ .............................................. G01V 1/28
[52] U.S. Cl. ..................................................... 367/73
[58] Field of Search .............................. 367/38, 50, 73; 364/421

[56] References Cited

U.S. PATENT DOCUMENTS

| | | | |
|---|---|---|---|
| 3,159,231 | 12/1964 | Silverman | 367/73 |
| 4,415,999 | 11/1983 | Moeckel et al. | 367/73 |
| 4,679,174 | 7/1987 | Gelfand | 367/73 |
| 4,817,062 | 3/1989 | DeBuyl et al. | 367/73 |
| 4,839,869 | 6/1989 | Corcoran | 367/53 |

OTHER PUBLICATIONS

"Depth Migration of Complex Offshore Seismic Profiles," Lerner et al., OTC, Houston, May 8–11, 1978.
"Intrepretation of Velocity Spectra from Through Adaptive Modeling Strategy," Geophysics, vol. 37, #6, Dec. 1972.

Primary Examiner—Ian J. Lobo
Attorney, Agent, or Firm—Alexander J. McKillop; Charles J. Speciale; George W. Hager, Jr.

[57] ABSTRACT

An improved method for modeling the velocity of seismic energy in subterranean rock layers is described. The velocity is assumed to vary such that the gradient of the velocity, that is, the direction of maximum change in the velocity, is at all times perpendicular to the interfaces between the rock layers. Improved methods of generating a representation of a subterranean structure of the earth are also disclosed.

6 Claims, 2 Drawing Sheets

METHOD OF MODELING SUBSURFACE FORMATIONS

FIELD OF THE INVENTION

This invention relates to an improved method of modeling the subterranean structure of the earth. More particularly, the invention relates to a method of modeling the subterranean structure of the earth in which improved velocity estimations are provided, which are anticipated to yield improved understanding of the subterranean structure of the earth.

BACKGROUND OF THE INVENTION

In seismic exploration of the earth, as practiced in the search for oil, gas and other minerals, a burst of low frequency energy is imparted to the earth at a first location. For example, in exploration of the seabed, a ship towing one or more compressed air "guns" will fire a "shot" at regular intervals, e.g. every 10 seconds. A "streamer" of "hydrophones" trailing behind the ship detects return of the acoustic energy of the "shot" after reflection from interfaces between rock layers of the seabed. Similarly, in land-based exploration, a charge of explosives is detonated or a heavy weight is dropped to impart a pulse of energy into the earth. A "spread" of "geophones" detects return of the acoustic energy to the surface of the earth after reflection at interfaces between the subterranean rock layers.

The signals detected at the surface are conventionally recorded with respect to each of the detectors and if graphed display amplitude data varying with time. "Wavelets" corresponding to the pulse of energy having been reflected from a subterranean interface are received and appear in the seismic "trace" recorded with respect to each individual geophone. There is extensive art relating to the processing of these "traces" to yield seismic records or "seismograms", which represent with more or less accuracy cross-sectional "pictures" depicting the subterranean structure of the earth. Such a cross-sectional slice through the earth underneath the line of geophones provides definition of the interfaces between the various layers of different types of rock. Certain typical structures are known to be more likely to contain oil and gas than other types of structures.

The traces which are recorded depict the amplitude of the output signals of the geophones versus time. The traces are readily ordered according to the "offset", that is, the distance of the corresponding geophones from the shotpoint. In order to generate a "picture" of the subterranean structure, that is, to provide a cross-section through the earth in two spatial dimensions (depth in the earth versus displacement from the location of the shot along the surface) from the amplitude versus time data which is recorded by each trace, it is essential to know the velocity of the pulse of energy in the various rock layers. This velocity information is essential in translating the time information provided by the geophones into distance information, indicative of the distance of the interfaces between the rock layers from the surface.

The relative velocity of sound in the various layers also determines the way in which a particular wave or ray will travel between the source and each geophone. According to Snell's Law, the angle made by a ray (whether of light or sound) at an interface between different media (e.g. water and air in the case of a light ray, or two different rock layers in the case of a seismic wave of acoustic energy) is determined by the relative velocity of the ray in the two media. Accordingly, if one wishes to trace a hypothetical ray from a particular source to a particular geophone, it is essential to know or make assumptions concerning the velocity of sound in the various rock layers.

Finally, the velocity of sound in a particular layer is indicative of the type of rock of the layer, which is itself of interest.

Given valid velocity data and reasonable assumptions concerning the shapes of the interfaces, that is, the thickness of the various layers, one can construct a synthetic seismic record. This can be compared to the actual seismic record, allowing the accuracy of the model to be evaluated. The assumptions can be changed as needed, the model recalculated, and so on until a reasonably accurate model of the subterranean "structure" has been reached.

The normal practice in the seismic art is to assume that the velocity of sound is either constant in the various layers or varies linearly with depth in the structure. That is, it is usually assumed that as the wave travels further into the earth, its velocity increases as the structure becomes denser due to its greater depth in the earth. These assumptions are used in modeling the earth, e.g. in generating a synthetic seismogram. Moreover, the seismic processing techniques used normally require the assumption that the structures are layered regularly. It will be appreciated, of course, that these assumptions are rarely if ever correct and that more accurate assumptions would yield improved results. It is an object of this invention to provide a velocity model more likely to correspond to reality, and which permits the employment of more complex models of the subterranean structure of the earth.

SUMMARY OF THE INVENTION

According to the present invention, the assumption made by the prior art that the variation of the velocity of sound in rock layers, if any, is linear, is replaced by one in which it is assumed that the variation is described by Laplace's equation. According to this equation, the variation in the velocity, that is, the gradient of the velocity, is at all times normal to each interface between layers.

In effect, this means that the velocity will vary in a manner which is consistent with layered structures. This assumption agrees with the geologically sensible notion that subsequent deformation of a plane parallel layered structure will result in locally parallel layers. For example, layers which are originally parallel—e.g. by deposition at the bottom of a prehistoric lake—can be expected to remain substantially parallel after subsequent deformation. This method also provides a velocity model with minimal discontinuity in the velocity between the adjacent layers. This assumption also smoothes the model output, e.g., the velocity varies in a smooth and continuous fashion along the layers. Nevertheless, the modeling technique of the invention is flexible enough to allow simulation of geological discontinuities such as faults or unconformities in the structure.

BRIEF DESCRIPTION OF THE DRAWINGS

The invention will be better understood if reference is made to the accompanying drawings, in which.

DESCRIPTION OF THE PREFERRED EMBODIMENTS

Figure 1:
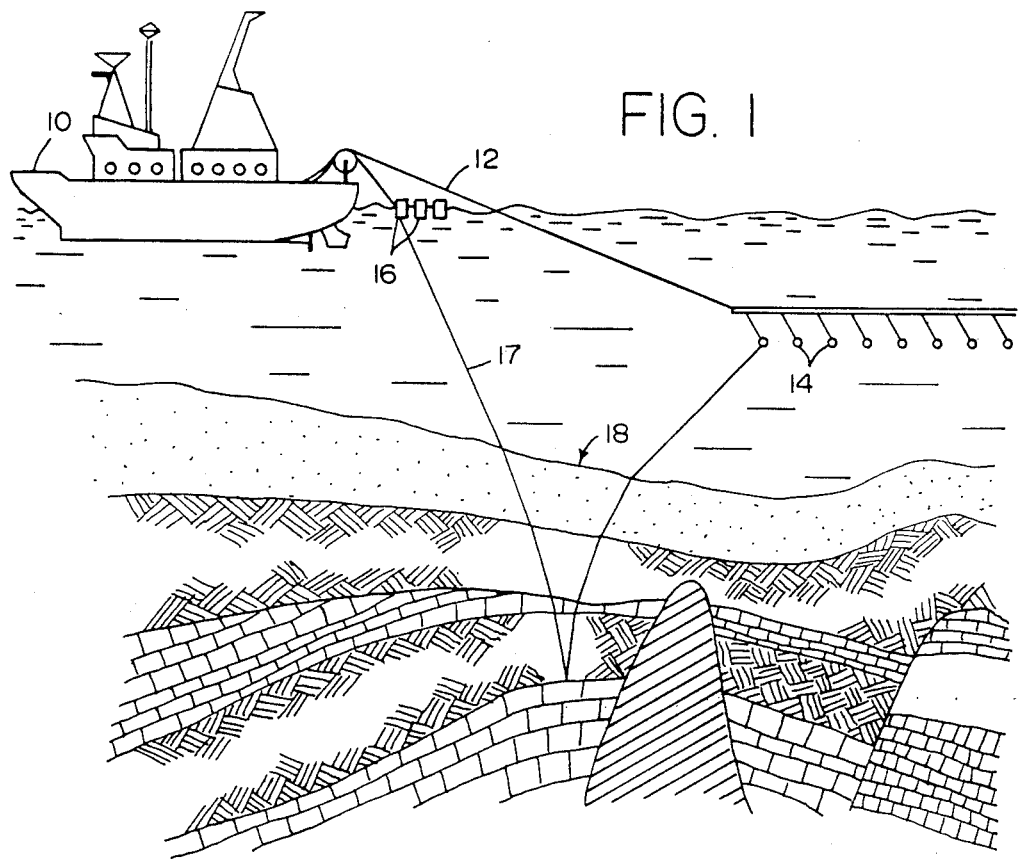
FIG. 1 shows schematically a typical seismic exploration operation.

As indicated above, FIG. 1 shows schematically a typical ocean-borne seismic exploration operation. An exploration ship 10 trails behind it a streamer 12 comprising a number of hydrophones 14. One or more compressed air guns 16 towed behind the vessel 10 emit pulses of acoustic energy into the water at regular intervals, e.g. every ten seconds. The acoustic energy travels downwardly into the water in all directions. Only one ray 17 is shown, exemplifying one typical path of the energy, for clarity. The ray 17 enters the seabed 18 and travels through the various rack layers as indicated. Varying amounts of the energy of the ray 17 are reflected at the interfaces between the differing rock layers, so that a large number of different reflections occur; only one reflection, at an interface between two rock layers, is shown, for clarity. The reflected ray travels back upwardly through the layers, and is ultimately detected at one of the hydrophones 14.

As shown schematically, the direction of the ray path varies in the different rock layers according to Snell's law as described above. That is, the angles made by the ray at each interface are determined according to the relative velocity of acoustic energy in the layers and the angle of incidence of the ray on the interface.

Figure 2:
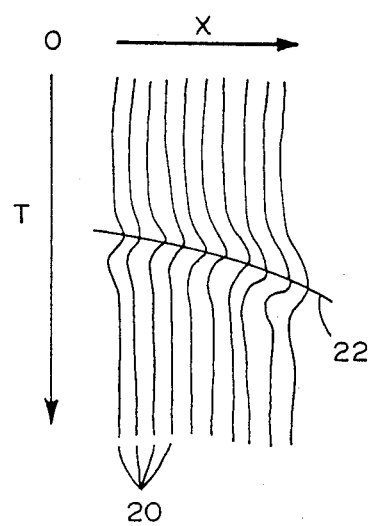
FIG. 2 shows schematically a typical seismogram, made up of a number of seismic traces, each representing the amplitude of a signal provided by one of a number of geophones as functions of time.

FIG. 2 shows schematically a number of seismic "traces" 20 corresponding to reflection of the seismic energy from a "common depth point" (CDP) in the seabed which have been "gathered" as understood in the art to form a "CDP gather." Each trace is the signal output by one of the hydrophones 14 over time, with time t being the vertical axis in FIG. 2. Each trace of the CDP gather is individually selected from the much more numerous traces recorded corresponding to a succession of shots. The selection is made in a well-known fashion, based on geometrical considerations, so that each trace selected correspond to reflection from the same point on a particular interface, i.e. a "common depth point". When a number of traces 20 are ordered according to the displacement x of the corresonding hydrophone from the shot point, and are gathered, i.e. displayed next to one another, the characteristic dipping shape of the wavelets in the traces shown at 22 is observed. This is an artifact which occurs because the CDP traces recorded at longer shot point-to-receiver locations correspond to longer travel times for the seismic energy.

The next processing step is conventionally correction for "normal move-out", whereby the traces are compressed in time to compensate for the varying distance traveled by the energy with respect to the various geophones. After this normal move-out correction, the wavelets of the traces of the CDP gather will be aligned, i.e., the dipping shape 22 will have been removed. Conventionally, the CDP traces are then algebraically summed or "stacked" which increases the signal-to-noise ratio. A larger number of these "stacked traces" can then be similarly displayed next to one another to yield a picture of the subterranean structure, again appearing generally as in FIG. 2. If a deflection then appears in each of the traces, as indicated generally at 22, it corresponds to the actual shape of an interface from which the various rays of seismic energy were reflected within the earth.

In order to generate an accurate "picture" of the subterranean structure, one must know the velocity of the sound wave in each of the layers; this information is required to translate the time information provided by the traces into distance, that is, depth, information needed to accurately depict the structure of the earth, and, of course, for normal move-out correction.

As indicated above, conventionally the assumption is made that the velocity of sound is either constant or varies linearly in each layer; also conventionally, the initial model includes essentially flat layers. Further, assumptions are made concerning the velocity of sound in each layer at its upper and lower interfaces. The change in the velocity of sound in each layer can then be calculated; the velocity at the upper and lower interfaces provides boundary conditions on the velocity in each layer. The path of a hypothetical or synthetic acoustic ray starting downward in the formation at any particular incident angle can be traced through the entire formation, using Snell's Law. The total travel time can then be calculated and used to generate a synthetic trace, in which the wavelet indicative of return of the energy to the surface appears spaced downwardly by a distance proportional to the total travel time. A number of these synthetic traces can then be processed as are the real traces, and used, e.g., to generate a synthetic seismogram, consisting of a number of such synthetic traces, which is directly compared to the recorded seismogram to evaluate the accuracy of the model. The model can then be revised as indicated, and the process repeated indefinitely.

The accuracy of the final model, however, is limited in the prior art by the assumptions mentioned: flat (or parallel) layers, and linear variation of velocity in each layer. Neither of these assumptions is likely to be correct in any actual exploration location. Therefore, according to the prior art, these assumptions provide ultimate limits on the accuracy of the model derived.

According to the present invention, the velocity of seismic energy in each layer is modeled using the assumption that it varies such that the direction of its maximum variation is perpendicular to the interfaces between the varying rock layers. Stated differently, the velocity of sound in each layer is assumed to vary between upper and lower boundary conditions at the interfaces between layers. In effect, the gradient of the velocity field is set to be maximum at all points normal to the interfaces between the layers. If the upper and lower interfaces are at an angle to one another the gradient will be curved.

The equation used to describe this condition takes the familiar form of Laplace's equation:

$$\frac{\partial^2 v}{\partial z^2} + \frac{\partial^2 v}{\partial x^2} = 0$$

where v = velocity of sound x = displacement between shot point and detector z=depth This assumption is then used by a modeling program to completely specify the velocity at all points in the structure from the starting data. The starting data, that is, the velocity of a few points in the structure, can be assumed, deduced or experimentally determined, e.g., by drilling to establish a few reference points in the structure. This velocity model can then be used in a generally conventional manner to calculate more sophisticated and accurate simulated seismic records. The net result is that a more accurate picture of the earth is generated.

Figure 3:
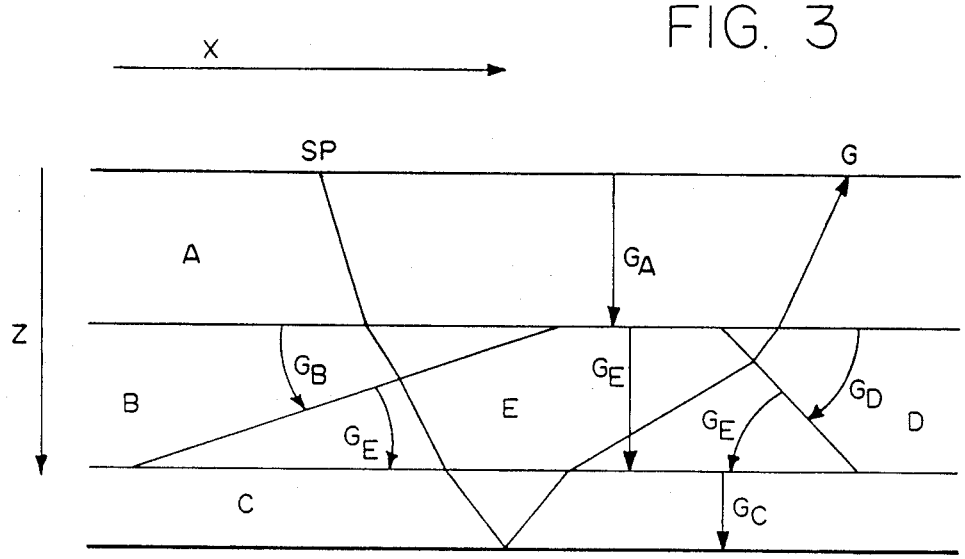
FIG. 3 shows a typical velocity model.

FIG. 3 shows schematically a simulated velocity model of the earth. The horizontal axis x represents distance from the energy shot point (SP), at which the pulse of acoustic energy is imparted to the earth, to the geophone G at which a particular trace 20 (FIG. 2) is assumed to be recorded. The vertical axis z represents depth in the earth. The exemplary model shown consists of five distinct regions of varying types of rock denominated A, B, C, D and E. The starting point assumptions concerning their shape will be based upon the operator's experience and interpretation of the recorded seismogram. Initially, each layer will have assigned to it a nominal thickness and an initial assumption concerning the velocities at the interfaces. As indicated, conventionally the velocity in each layer is assumed to be either constant or to vary linearly between assumed boundary conditions, that is, the velocity at the upper and lower interfaces of each layer. According to the invention, the velocity is instead assumed to change between the assumed boundary conditions such that the gradient of the velocity, that is, the maximum rate of change in velocity with distance in each layer, is perpendicular to the interfaces between the various layers. The direction of the change in velocity is as shown in each layer of the model by the letters $G_A$, $G_B$. . . $G_E$. Where the layer is flat, as in the case of layers A and C, the velocity assumption made according to the invention reduces to the conventional linearly varying velocity. In a region where the interface is not horizontal, such as between regions B, E and D in the drawing of FIG. 3, the method of the invention provides different results; as indicated, the gradient G describes a curve in these portions of these layers, in order that it can be normal to both interfaces.

In generating a synthetic seismogram, either according to the conventional practice or according to the invention, the velocities at the top and bottom of the layer, that is, the boundary conditions on each layer, must initially be set by the operator. Thereafter, according to the invention, a typical computer processing step will be employed to calculate the velocity of sound throughout the regions of interest in the modeled subterranean structure. As conventionally, rays of simulated energy can then be traced from simulated shot points to simulated geophone locations along the X axis. The times for each simulated shot to reach the receivers can then be calculated and plotted to yield synthetic traces. These can be gathered to form a synthetic seismogram which corresponds to a real seismogram generated by gathering actual raw (i.e., unprocessed) field data. Optionally, the synthetic traces can then be processed as are the real traces, e.g. normal move-out corrected and stacked, to yield synthetic "images" of the model structure directly comparable with the images generated using the recorded data. Based on the differences, new velocity and layered-structure assumptions can be made and the model recalculated. Ultimately, the model structure will yield synthetic images sufficiently similar to the images generated using the recorded data that the model can be assumed to be essentially correct. The model can then be analyzed by geophysicists in the search for oil, gas or other minerals.

Figure 4:
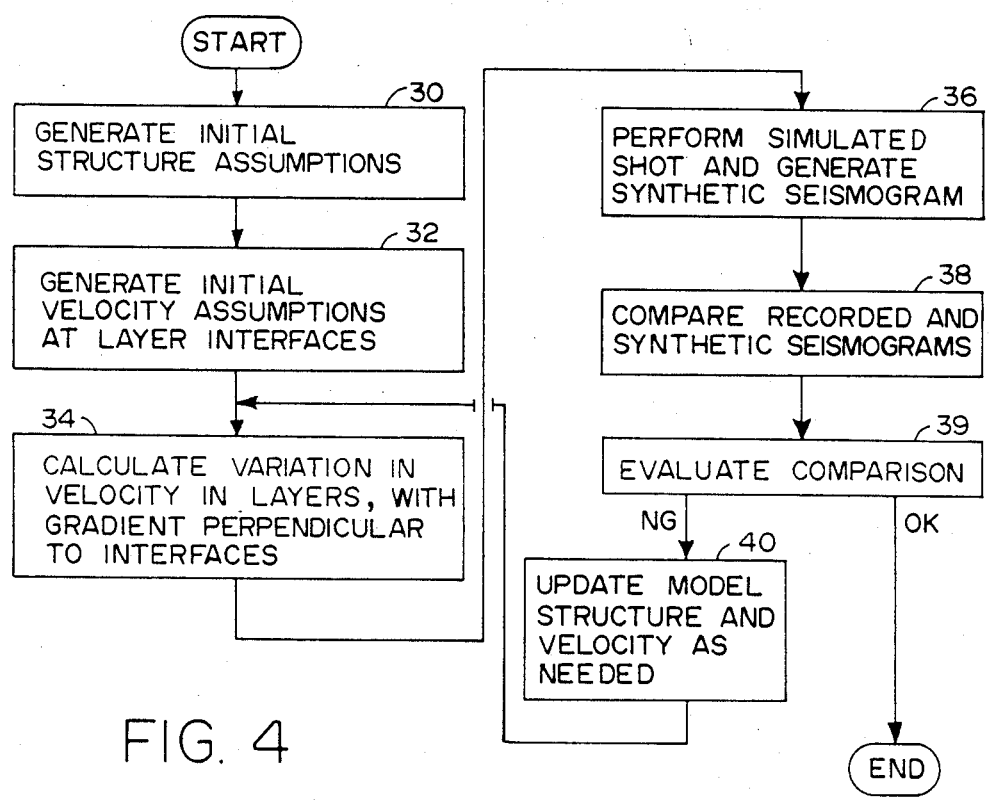
FIG. 4 shows a flowchart of typical steps in generating a depiction of a model structure according to the invention.

A typical process according to the invention is shown schematically in flow chart form by FIG. 4. As shown at step 30, initial structure assumptions are made, that is, concerning the arrangement of the layers and of their various rock types. This will typically be done by the operator based on the recorded seismogram. At 32, initial assumptions are made concerning the velocity of sound at the interfaces, that is, the boundary conditions on the various rock layers. At step 34 the variation in the velocity of sound within each layer between the boundary conditions is calculated. According to the invention, as indicated, this is done by assuming that the velocity varies such that the gradient of the velocity is normal to the interfaces, that is, the maximum rate of change in velocity in each layer with distance is perpendicular to the interface between the rock layers. As indicated, in the prior art, the comparable calculation of velocity in the layers is performed simply by assuming that the velocity is constant throughout the layers or that it varies linearly between the upper and lower boundary conditions.

At step 36, a simulated shot is performed, and a synthetic seismogram is generated. This step is to be considered exemplary of any known method of generating a synthetic seismogram based on a model of the structure of the earth. The synthetic seismogram can be generated in a number of different ways. For example, ray tracing is commonly performed. In this technique, an initial angle for a ray emanating from a shot point is assumed and the ray is simply traced through the various layers of interest in the model, using Snell's Law to calculate the deflection at each interface. A strong reflection is assumed at a particular interface of interest, and the ray is traced similarly upwardly until it reaches the surface. The total travel time is then readily calculated using the velocities of the velocity model. A trace of the synthetic seismogram having a wavelet at a depth corresponding to the calculated total travel time is then drawn. The trace is located on the synthetic seismogram at a point corresponding to the location on the surface at which the simulated ray emerged from the subsurface. The process is repeated for a number of different rays, providing different initial angles for each, until a simulated seismogram of sufficient completeness has been generated.

The synthetic and recorded seismograms are then compared at step 38. The comparison is evaluated at step 39; if it indicates that the two seismograms are very similar ("OK"), the model is assumed to be essentially accurate; if not ("NG"), the model structure and velocity assumptions are updated at step 40. Steps 34, 36, 38, 39 and 40 are repeated as needed until a satisfactory synthetic seimogram has been generated. The model used to generate the satisfactory simulated seismogram is then assumed to depict the actual structure of the earth accurately in the vicinity of the seismogram.

Use of the term "seismogram" here and in the appended claims is meant to indicate that the traces which are gathered to form the "images" which are compared need not have been extensively processed, i.e. normal move-out corrected, stacked, etc., all as described above. Such steps are nevertheless within the scope of the invention. As will be appreciated by those of skill in the art, it is necessary that the same steps be performed with respect to the synthetic and recorded traces in generating the images of the actual and model structures which are compared.

It will be appreciated by those of skill in the art that velocity assumptions are made throughout the art of seismic data processing and interpretation, and that the above examples are only one way in which velocity assumptions calculated according to the invention can be used. Other modifications and improvements on the method of the invention may be made. Therefore, the invention should not be limited by the above exemplary disclosure, but only by the following claims.

What is claimed is:

1. A method of defining a model of the subterranean structure of the earth, comprising the steps of:
   providing initial assumptions concerning the structure of the earth, said assumed structure comprising a sequence of layers of rock of specified configuration, wherein the layers are not constrained to be defined by horizontal interfaces between adjoining layers;
   providing initial assumptions concerning the velocity of acoustic energy in the rock of the layers at the interfaces between the layers; and
   calculating the variation of the modeled velocity of acoustic energy within each of the rock layers between the assumed velocities at the interfaces between the layers, wherein said calculation is performed such that the gradient of the calculated velocity in each layer is perpendicular to the interfaces between the corresponding rock layers;
   wherein said assumed structure of each layer and the calculated velocity therein specify said model.

2. The method of claim 1 wherein said model of the earth is used to generate a simulated seismogram, and said simulated seisomogram is thereafter compared to a recorded seismogram for evaluation of the accuracy of the model thus generated.

3. The method of claim 2 wherein the calculated velocity and assumed structure making up said model are varied as needed responsive to evaluation of the accuracy of said model as determined in said comparison step, and said simulated seismogram is recalculated for further comparison to said recorded seismogram.

4. The method of claim 3 wherein said step of generating a simulated seismogram is performed by ray tracing, comprisng the steps of:
   generating a number of synthetic traces by performing the followidng steps with respect to each synthetic trace:
   making an initial assumption concerning the initial path of a ray of acoustic energy into the model; and
   calculating the path of said ray downwardly successively through the layers of said model, to an assumed reflection at a particular interface, calculating the path of the reflected ray upwardly to a point on the surface, and calculating the time taken for the energy to pass from the point at which it enters the model to the point at which it reaches the surface; and
   using said calculated value of the time to generate a single synthetic trace of the simulated seismogram; and
   gathering the generated synthetic traces to form a synthetic seismogram.

5. A method of generating a representation of the subterranean structure of the earth, comprising the steps of:
   (a) recording a seismogram by imparting a pulse of acoustic energy to the earth at a first location and recording signals representative of energy detected at a number of recording locations on the surface of the earth, after travel of said pulse into the earth and reflection from interfaces between rock layers;
   (b) generating a simulated seismogram by performing the following steps:
      (i) making an initial assumption concerning the structure of the subterranean structure of the earth in the vicinity at which the seismogram was recorded, said assumed structure not being limited to a sequence of flat layers of rock;
      (ii) making initial assumptions concerning the velocity of sound in each of the layers of the assumed model at the interfaces between the layers;
      (iii) calculating the change in velocity of sound in each of the layers of the assumed model such that the gradient of the velocity in each layer varies perpendicular to the interfaces between the rock layers; and
      (iv) generating a simulated seismogram using the model of the structure and the velocity assumptions thus calculated;
   (c) comparing said simulated seismogram to the recorded seismogram;
   (d) evaluating the accuracy of the corresponding between the simulated and the recorded seismograms;
   (e) if said accuracy is less than a predetermined acceptable level, altering the model velocity and/or structure assumptions and calculating a new simulated seismogram according to said steps (b) (iii) and (iv); and
   (f) performing said steps (b) through (e) until comparison indicates that a satisfactory model has been derived.

6. The method of claim 5 wherein said step (iv) is performed by ray-tracing techniques.

* * * * *